April 28, 1964     E. A. MEYER     3,130,822

PLASTIC MOLDING CLIP

Filed Sept. 25, 1959

INVENTOR.
Engelbert A. Meyer
BY R. P. Barnard
ATTORNEY

United States Patent Office 3,130,822
Patented Apr. 28, 1964

3,130,822
PLASTIC MOLDING CLIP
Engelbert A. Meyer, Detroit, Mich., assignor to General Motors Corporation, Detroit, Mich., a corporation of Delaware
Filed Sept. 25, 1959, Ser. No. 842,422
1 Claim. (Cl. 189—88)

The present invention relates to a new and improved clip of the type adapted to retain a trim molding strip upon a vehicle body. More specifically, the present invention relates to such a trim molding strip which is made entirely of plastic and of such design that the clip locking fingers are adapted to freely pass through a hole in the body after which a portion of the clip is moved relative to the locking fingers to move the fingers into positive locking engagement with the vehicle body.

In the past, it has been common practice to mount trim strips on the vehicle body by way of flexible clip members which are either mounted on the trim strip prior to assembly to the vehicle body or which clips are mounted in the vehicle body after which the trim strip is assembled thereon. In either case, it has been the practice to make such strips from metal and which metal clips have for many reasons proved to be unsatisfactory. First of all, it has been found that in inserting metal clips within the body openings that it has been common for such clips to scratch the body surface so as to remove portions of the paint therefrom providing a spot where corrosion can begin. Corrosion proximate trim clips has been enhanced by the fact that water frequently is able to pass between the trim strip and the clip member and thereby subject both the clip and the vehicle body to rusting. Rusting is, of course, facilitated by the fact that metal clips themselves tend to rust.

In providing the subject unique plastic clip, a design is achieved which both due to the plastic itself as well as the particular clip configuration eliminates the possibility of scratching the paint surface surrounding the body clip hole. Further, the clip material itself being of a non-corrodible substance results in a trim strip mounting assembly eliminating a major source of body corrosion.

The present clip is constructed in such a way that clip locking fingers may pass through the appropriate body hole relatively freely after which an integral portion of the clip is moved axially relative to the fingers to make the clip of a solid cross section across the body hole opening thereby mounting the clip and hence the thin molding strip to the vehicle body tightly.

Other objects and advantages of the present invention will be apparent from a perusal of the description which follows.

A vehicle body wall is shown at 10 and includes an opening 12 within which a clip 14 is adapted to be inserted. A trim molding strip 16 is adapted to be mounted upon a plurality of such clips to retain the strip to the body wall. In general, clip 14 is of the type adapted to be first mounted within vehicle wall opening 12 after which the trim strip is snapped thereover.

Figure 1:
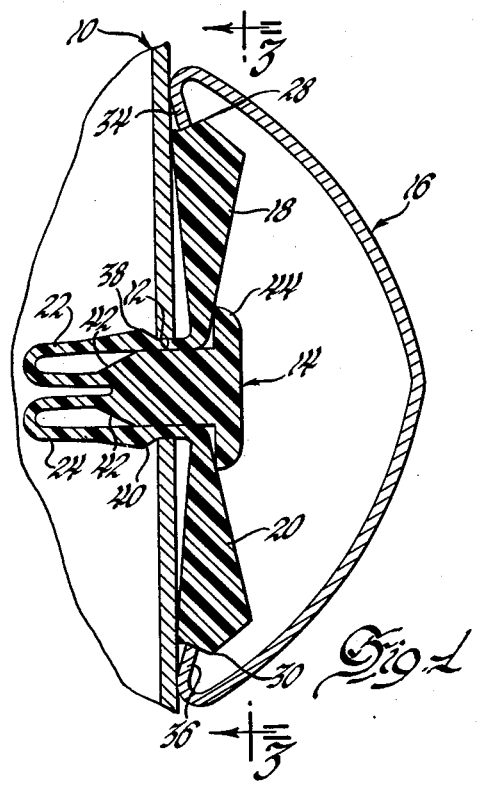
FIGURE 1 is a cross sectional view through a body wall upon which a trim strip is mounted by the subject clip.
Figure 2:
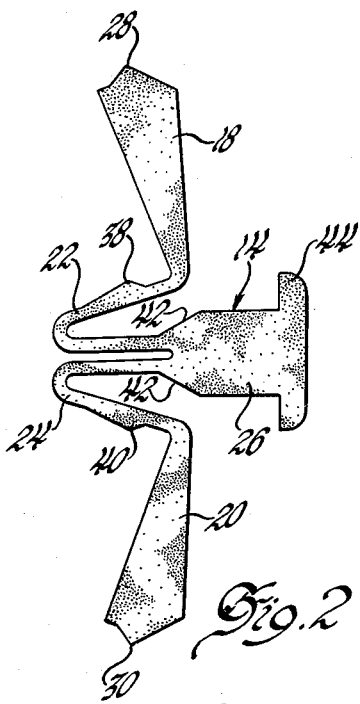
FIGURE 2 shows the clip design before being inserted into the body wall opening.
Figure 3:
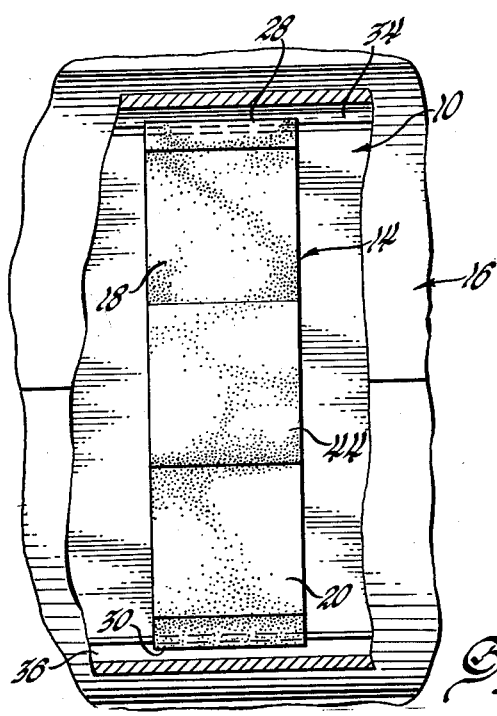
FIGURE 3 is a view along line 3—3 of FIGURE 1.

Before referring to the structural details of clip 14, it should be noted that the clip is made of any suitable plastic material and, as best seen in FIGURE 2, is designed in such a way as to lend itself to being formed by extrusion of molding processes. It is apparent that designing such a trim clip as to be susceptible to formation by extrusion or molding makes it possible for a plurality of such clips to be formed at one time and thereby considerably reducing the clip cost.

Clip 14 includes a pair of generally radially extending wing or arm portions 18 and 20, a pair of U-shaped locking members 22 and 24 including inner and outer legs extending in a direction generally transverse to arms 18 and 20, and which members terminate in a common enlarged body portion 26. Arms 18 and 20 are of a tapered cross section increasing in thickness from the junction with legs 22 and 24 to the outer periphery thereof. The outer end of arms 18 and 20 are thickened to provide inwardly inclined faces conjointly forming shoulders 28 and 30 over which inwardly curled edges 34 and 36 of trim strip 16 are adapted to be snapped in assembling the strip to the clip. In this embodiment, trim strip 16 is assembled to the clip by first moving one of the curled edges 34 or 36 over one of the clip shoulders 28 or 30 after which the other edge of the clip is snapped over the other clip shoulder.

Locking members 22—24 are each formed with a relatively thin cross section particularly at the closed end thereof in order to permit relatively easy flexure of the legs and further to permit a relative rolling action of the inner legs relative to the outer legs as occurs when the clip is mounted on wall 10 as will more clearly be understood as the description progresses. The outer legs of members 22 and 24 include a relatively gradually tapered surface and a relatively sharply inclined surface which coact to provide the outwardly extending locking projections 38 and 40.

The inner legs of members 22 and 24 are spaced and terminate in enlarged body portion 26. Body portion 26 includes inclined surfaces 42 at its inner end which provides for centering and easy access of the body portion when the same is moved axially relative to body wall opening 12. The other end of body portion 26 terminates in a head portion 44.

Figure 4:
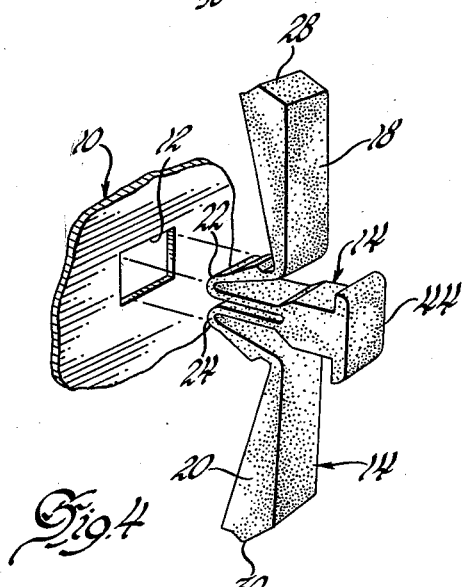
FIGURE 4 is an isometric view showing the clip about to be inserted within the body opening.

Clip 14 is mounted on wall 10 as follows. The clip is originally formed such that its body portion 26 is displaced axially with respect to arms 18—20 and members 22—24, as best seen in FIGURES 2 and 4, which permits the locking members to be inserted within wall hole or opening 12. Inserting members 22—24 through opening 12 will cause locking projections 38 and 40 to cam the outer legs radially inwardly relative to the hole to permit the projections to pass through the hole and be disposed within the inner portion of the body wall. This insertion of the members is easily achieved due to the flexibility of the clip as well as the clearance between the inner and outer legs. Thereafter, with the locking members fully inserted within wall opening 12, body portion 26 is driven axially between the outer legs of members 22—24 causing locking projections 38 and 40 to be moved radially into locking engagement with wall 10. In moving body portion 26 axially to lock the clip in position, a rolling action occurs at the junction of the inner and outer legs of members 22 and 24.

It is apparent that this type of axial or linear movement of one clip portion relative to another is uniquely realized with the subject plastic design whereas such movement would be highly impractical with a metal type clip. The flexibility of the plastic material of which clip 14 is formed permits the axial movement of body portion 26 to be achieved either by simply pushing on the body portion or else tapping the same into position with some relatively light instrument.

Head 44 is provided not only for limiting the axial movement of the body portion but also as a means for reinforcing or stiffening arms 18 in the area of reduced cross section and in this way rigidifying the clip so as to provide a more solid means for mounting the trim strip to the body.

I claim:

A molding clip for use in securing a molding strip having a pair of inturned flanges to a supporting panel having an aperture formed therein, said molding clip being formed of a fully flexible plastic material and comprising a body portion, a pair of U-shaped members extending from said body portion, the inner leg of each of said U-shaped members being integral with said body portion, an arm extending at a substantially right angle from each of the outer legs of said U-shaped members and in a direction away from said body portion and integral with said end of said outer leg of said U-shaped members, said U-shaped members and said body portion being receivable in said aperture in said supporting panel with said body portion between said outer legs of said U-shaped members and forcing said outer legs into retaining engagement with said panel, said arm members being engageable with said flanges on said molding strip to secure said molding strip on said supporting panel, and a projection on each of said outer legs of said U-shaped members adapted to coact with said supporting panel and retain said molding clip in said supporting panel.

References Cited in the file of this patent

UNITED STATES PATENTS

| | | |
|---|---|---|
| 2,275,127 | Brown | Mar. 3, 1942 |
| 2,594,211 | Poupitch | Apr. 22, 1952 |
| 2,637,880 | Beck | May 12, 1953 |
| 2,900,687 | Cochran | Aug. 25, 1959 |